Aug. 28, 1945.   J. J. BRADFORD   2,383,465
LAMINATED SLIDE FILM MOUNT
Filed Sept. 1, 1944
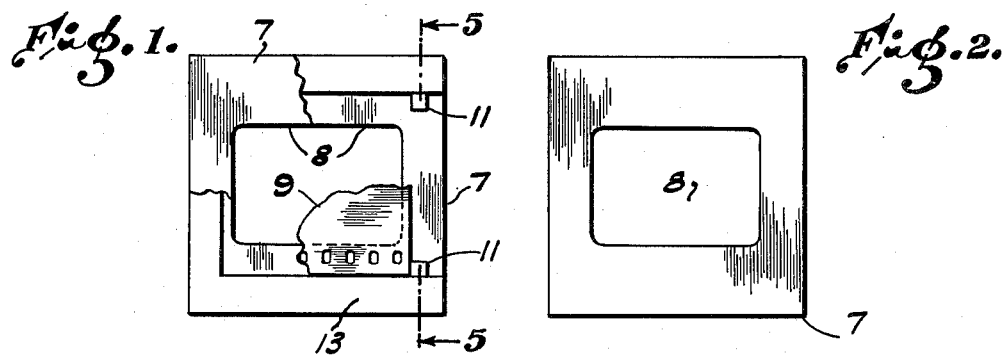
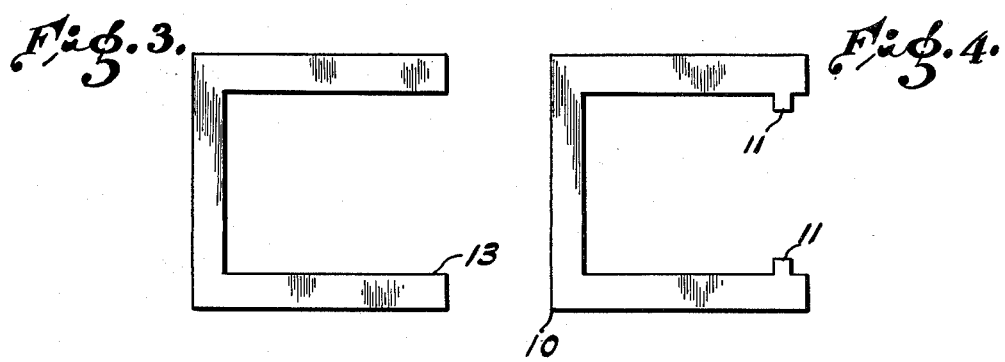
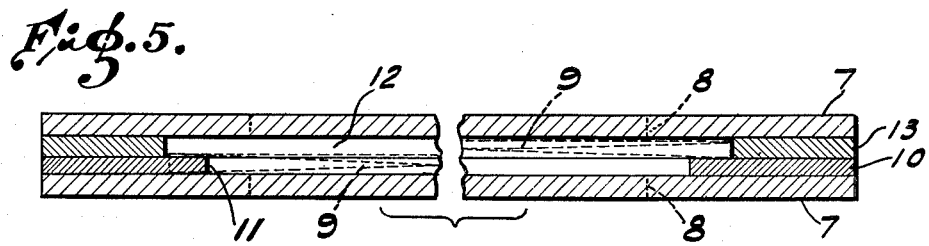
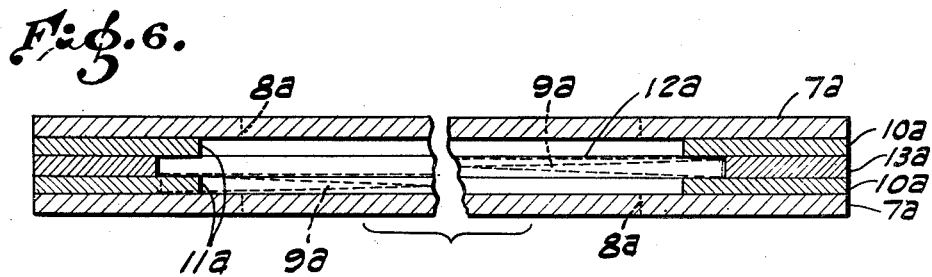
James J. Bradford
INVENTOR.

UNITED STATES PATENT OFFICE 2,383,465

LAMINATED SLIDE FILM MOUNT

James J. Bradford, Burbank, Calif.

Application September 1, 1944, Serial No. 552,266

4 Claims. (Cl. 88—26)

This invention relates to a slide film mount of a flat laminated character.

Among the objects of the invention are: to provide a laminated slide film mount composed of flat laminae; to provide a laminated slide film mount wherein one or more of the laminations is provided with means to protect the sensitized area of the film from being marred during insertion or removal of the film from the mount and also to hold the film in seated position after its insertion; to provide in a laminated slide film mount a spacer lamination to allow for the expansion of the film when subject to heat; and further to provide a device of the above character which eliminates the step of embossing or platesinking, thereby to simplify and cheapen the manufacture through the elimination of metal dies now unavailable on account of the allotment of metal for the war effort.

Other objects, advantages and features of invention will hereinafter appear.

Referring to the accompanying drawing, which illustrates what is at present deemed to be a preferred and alternate embodiment of the invention, Fig. 1 is a plan view of the assembled device, certain portions being broken away to show underlying structures.

Fig. 2 is a plan view of the top and bottom cover laminations.

Fig. 3 is a plan view of the spacer lamination.

Fig. 4 is a plan view of the locking lamination.

Fig. 5 is an enlarged fragmentary section taken on line 5—5 of Fig. 1.

Fig. 6 is an enlarged modified fragmentary section, the line of section being indicated by the line 5—5 of Fig. 1.

Referring in detail to the drawing the numeral 7 indicates the matchable top and bottom frame members each of which consists of a lamination which is flat throughout its entire extent and which is provided with a sight opening 8 through which the picture containing portion of the film 9 is projectable onto the screen, said laminations being separately shown in Fig. 2. The bottom frame member, farthest from the observer as viewed in Fig. 1, is considered for the purpose of disclosure the front plate and the top frame member is considered the back plate.

10 indicates the locking lamination, so called because it is provided with integrally, inwardly projecting locking lugs 11 which project sufficiently far into the entrance space 12 alloted for the film's insertion to maintain it in place after being seated in the frame pocket. Said lugs perform the function not only of holding the film in its inserted position as shown in Fig. 1, but they also serve to elevate the emulsified side of the film sufficiently far above the frame portion of the film mount, as dottedly shown in the upper right in Fig. 5, to prevent the emulsification from contacting it during insertion and withdrawal and thereby mar its image surface. In Fig. 1 the emulsion side of the film is farthest from the observer.

13 indicates the spacer lamination and its thickness is equal to or slightly greater than the thickness of the film. In Fig. 5 the spacer lamination is shown overlying the locking lamination 10 and underlying the top cover frame lamination 7. In the upper right of Fig. 5 the dotted indication of the film 9 illustrates how the film is introduced through the entrance opening 12 prior to being seated in its pocket as shown in Fig. 1. The spacer lamination in shape resembles a broad, right angularly shaped U with its outer dimensions equal to the frame members 7, but the inner edge portion of the U is spaced on three sides away from the opening 8 in the frame members to provide for sufficient edgewise clearance for the inserted film. With the exception of the locking lugs 11, laminations 10 and 13 are of the same size and shape and when assembled with the frame members as shown in section in Fig. 5 with their inner edge portions alining cooperate to form the film receiving pocket between the holding frames 7.

In the left hand part of Fig. 5 the dotted indication represents the outline of the inserted film. From this view it will be seen that the thickness of the film 9 is slightly greater than the locking lamination 10 and that owing to the flexible character of the film its accidental removal through the entrance opening 12 is prevented by the lugs 11 unless the operator, by his fingers, first alines the film with said opening.

In Fig. 6 the modification there shown illustrates an upper as well as a lower locking lamination with the spacer lamination therebetween, thus making it impossible to scratch the emulsified side of the film 9a irrespective of which side is maintained uppermost during its insertion. The entrance opening 12a shown at the right hand side of Fig. 6 with the film dottedly indicated therein, illustrates this safety insertion feature. In this modification, owing to the fact that two locking laminations are used in combination with the spacer lamination the combined thickness of these three laminations will be varied as may be necessary to provide a film pocket of the thickness required for the film's expansion when heated.

In assembling the film mount frame, the locking lamination is superimposed upon the frame plate 7, then the spacer lamination is superimposed upon the locking lamination, and finally a second frame plate 7 is superimposed upon the spacer lamination. The combination thus assembled is secured together in any suitable manner as for example by gluing or stapling. The foregoing assembly relates to the showing in Fig. 1 or Fig. 5. However, in certain instances it may prove advisable to provide an extra locking lamination as shown in Fig. 6. When such a lamination is added it is placed between the spacer lamination and the back plate, the lower plate in Fig. 6 being considered the front plate like the plate in Fig. 1. When the second locking lamination is added, the attendant may insert the film through the entrance opening 12a with either side up without fear of marring the emulsification.

The parts comprising the assembly in Fig. 6 are numbered the same as the parts comprising the assembly in Fig. 5 except that each numeral is subjoined by the letter a.

What is claimed is:

1. In a device of the kind described, a front frame lamination, a locking lamination overlying said front lamination, a spacer lamination overlying said locking lamination, and a back cover lamination overlying said spacer lamination, said front and back laminations being provided with a film projection opening, said locking lamination and spacer lamination each comprising a broad rightangularly shaped U, the outer edge portion of which alines with the outer edge portions of said front and back frame members, the inner edge portion of each said U being spaced away from said projection opening on three sides leaving the fourth side open to afford an entrance opening for inserting the film, said locking lamination being provided with an internally projecting locking lug at each side of said entrance opening.

2. In a laminated slide film mount, a front frame lamination and a back frame lamination each provided with a film projection opening, a locking lamination and a spacer lamination mounted between said front and back frames, said locking and spacer laminations each comprising a broad rightangularly shaped U, the inner edge portions of said locking and spacer laminations alining and being spaced away from said projection openings on three sides leaving the fourth side open to afford an entrance and withdrawal opening for the film, said locking lamination being provided with an internally projecting lug at each side of said entrance opening.

3. In a laminated slide film mount, a front frame lamination and a back frame lamination each provided with a film projection opening, a locking lamination overlying said front frame and another locking lamination underlying said back frame, a spacer lamination positioned between said two locking laminations to complete the film mount assembly, each of said locking and spacer laminations comprising a broad rightangularly shaped U, the inner edge portions of said locking and spacer laminations alining and being spaced away from said projection openings on three sides to form a film receiving pocket leaving the fourth side open to afford an entrance opening for the film, said locking laminations being provided with an internally projecting locking lug at each side of said entrance opening.

4. A slide film mount comprising a plurality of flat laminations consisting of a top and a bottom cover frame lamination provided with registering openings, a spacer lamination interposed between said top and bottom frames whose inner edges are spaced away from said registering openings on three sides leaving the fourth side open wherethrough to introduce a picture film, a locking lamination occupying space between one of said cover frame members and said spacer lamination, the inner edge portions of said locking lamination being spaced away from three sides of said registering openings leaving the fourth side open like said spacer lamination to cooperate with the latter lamination to provide additional space for the film to expand when subjected to heat from a lamp in projecting the film picture onto a screen, and lugs carried by said locking lamination and projecting from opposite sides into the opening provided on the fourth side of the assembled mount through which the film is inserted and withdrawn.

JAMES J. BRADFORD.